United States Patent [19]

Brady, Jr. et al.

[11] Patent Number: 4,627,829
[45] Date of Patent: Dec. 9, 1986

[54] CENTERFOLD FORMING APPARATUS FOR A DISK ENVELOPE

[75] Inventors: William A. Brady, Jr., Lake Worth; Stanley R. Jordan, Boca Raton; Eugenio J. Morgado, Miami; Julius J. Perlini, Boynton Beach; Alfred A. Stricker, Pompano Beach, all of Fla.

[73] Assignee: International Business Machines Corporation, Armonk, N.Y.

[21] Appl. No.: 698,513

[22] Filed: Feb. 4, 1985

[51] Int. Cl.$^4$ .................. B31B 21/02; B31B 21/26; B31B 21/60
[52] U.S. Cl. .................. 493/189; 156/216; 156/217; 156/227; 156/475; 156/477.1; 156/479; 156/486; 156/492; 156/499; 493/251; 493/406
[58] Field of Search ............... 156/217, 243, 475, 227, 156/492, 216, 226, 476, 477.1, 478, 479, 482, 486, 499, 578; 493/133, 141, 247, 251, 470, 96, 468, 408, 189, 406, 946; 425/397; 360/135

[56] References Cited

U.S. PATENT DOCUMENTS

| | | | |
|---|---|---|---|
| 3,043,363 | 7/1962 | Byers | 156/443 |
| 4,272,235 | 6/1981 | Barnett | 156/443 |
| 4,310,371 | 1/1982 | Appoldt | 156/227 |
| 4,347,091 | 8/1982 | Hauck | 156/217 |
| 4,447,218 | 5/1984 | Bertsch | 493/251 |
| 4,465,453 | 8/1984 | Turner | 425/397 |

Primary Examiner—Michael Wityshyn
Assistant Examiner—J. Davis

[57] ABSTRACT

Apparatus for forming a disc envelope from a pre-punched, flexible, plastic blank having two sections connected at the heads thereof and containing a drive hole at the same location in each section. The drive holes are located on respective hubs which are located at the same position on respective folding plates. The end edge of a mandrel is pressed against the blank in the area between the two sections while the folding plates are moved from a horizontal to a vertical position pulling the drive holes taut on the hubs and thereby locating the center fold between the two sections of the blank flap folding apparatus and sealing apparatus are attached to and swing into operating position with the respective folding plates to form the side flap folds and seal the folded flaps.

4 Claims, 12 Drawing Figures

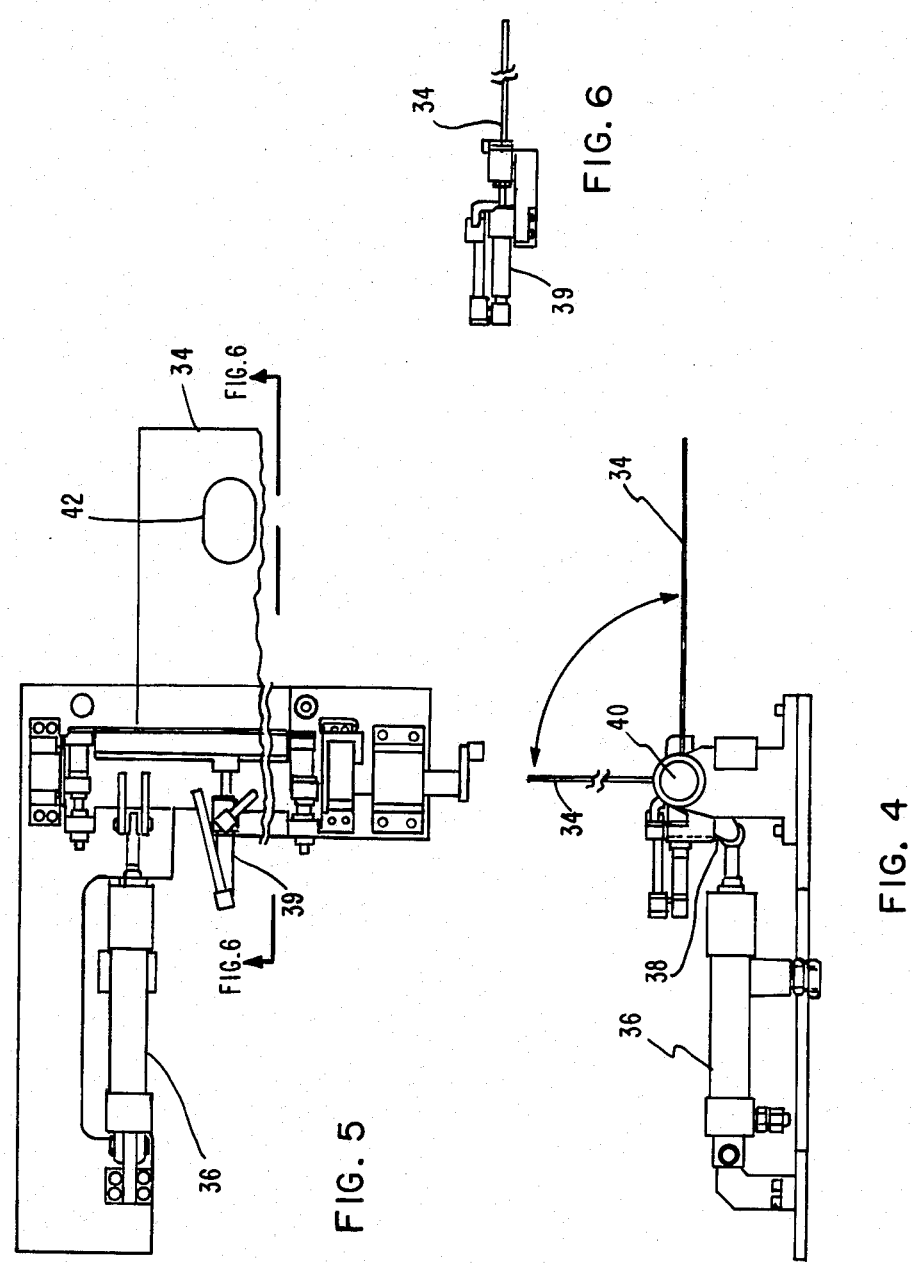

CENTERFOLD FORMING APPARATUS FOR A DISK ENVELOPE

FIELD OF THE INVENTION

The invention relates to apparatus for manufacturing envelopes for flexible disks and, more particularly, to the centerfold locating and forming apparatus which forms the bottom edge of an envelope for a flexible disk from a prepunched blank.

BACKGROUND OF THE INVENTION

Flexible disks, known as floppy disks, are generally made of plastic and are utilized for recording and reading-out information usually in an off-line mode in a data processing system. These flexible disks are light weight, relatively low cost and convenient to use. The disks are packaged in envelopes formed from sheets of flexible plastic, such as polyvinyl chloride. The envelopes have aligned center or drive holes which allow the enclosed flexible disk to be rotated within the envelope. The envelope is lined with a layer of a low friction wiper material. The envelope includes slots which permit writing and reading into and from the disk.

The flexible plastic envelopes are formed from precut and prepunched sheets of plastic material which have the center drive holes and access slots prepunched therein. Half of a precut sheet or blank is rectangular and the other half is identical, except that it includes three flaps which extend from its three outer edges. The low friction liner or wiping material is attached to the inner surface of the sheet prior to cutting and punching. The envelope is formed by folding each half of the sheet against the other half, making a centerfold therein. The side flaps are folded around the edges of the opposite half of the sheet and are sealed thereto. A flexible disk is then inserted into the envelope and the third or end flap is then folded to complete assembly of the flexible disk and envelope. The folds must be exactly located and formed in order to meet the specifications for the flexible disk unit. If the folds are of too small a radius, the friction between the disk and the liner will increase the torque required by the flexible disk drive system. Too large a fold radius will result in insufficient friction of wiping material against the disk resulting in an out of specification flexible disk unit. Warpage of the completed flexible disk unit must be kept within tight tolerances to produce an acceptable flexible disk system. Locating the centerfold precisely in the middle of the two registration holes eliminates the dimensional difference. That is, the dimensional tolerance between hole centers, and the individual hole diameter tolerances, will be evenly divided about the middle fold of the finished product.

Accordingly, it is the main feature of the invention to precisely locate and form the centerfold in the flexible plastic prepunched sheet to minimize registration hole, misregistration problems.

It is another feature of the present invention to accurately locate and form the centerfold therein so that product blanks which were manufactured in a "worst-case" tolerance condition can be utilized.

The operation of the centerfold forming apparatus also brings the side flap folding apparatus and the sealing apparatus into operating position within the same station.

DESCRIPTION OF THE PRIOR ART

It is known from the prior art that folding blades are used to make centerfolds in prepunched flexible blanks. The blades are moved in an arcuate path contacting one of the two sections of the blank and folding it over a folding plate. In most instances, the folding blade holds the folded over section in position while a heating bar is applied to the fold to thermally set the fold. U.S. Pat. No. 4,304,621 issued Dec. 8, 1981, shows such an apparatus as just described for making a fold in the center of the blank.

Apparatus in which the blank is not folded over a center blade is shown in U.S. Pat. No. 4,272,235 issued June 9, 1981. In this patent, the center drive hole of one section is placed over a hub and the second section is folded back and placed over the same hub. A folding bar which is operable vertically is pressed down on the fold to apply pressure thereto and give the desired small radius.

As can be seen, the prior art does not locate the centerfold precisely and therefore does not compensate for the hole misregistration problem. Therefore, the blank used in the prior art must be manufactured, that is, punched with a very close tolerance to be usable utilizing the prior art centerfold techniques.

SUMMARY OF THE INVENTION

Briefly, the invention consists of a centerfold forming apparatus for forming a centerfold between two sections of a prepunched flexible plastic blank which contains a drive hole at the same location in each section, one section having folding flaps extending from three edges thereof. The apparatus consists of a first and second folding plate positioned head to head lying in the same horizontal plane. The flexible plastic material blank is positioned against the surface of said first and second folding plate. Drive and pivot means located between the first and second folding plates move them in an arcuate path so that the continuous surfaces are positioned in vertical planes facing each other. The plastic blank is located on the surfaces with the holes therein registered on hubs located at the same location in each continuous surface. A mandrel or folding blade is extendable vertically and has an edge thereof pressed against the blank in the area between the first and second plates pulling the drive holes in the blank taut on the hubs, thereby locating the center line of the blank with respect to the bottom of the holes in the blank and the bottom of the hubs. The blank is bent along the pressing edge of the mandrel when the folding plates move from the horizontal to the vertical facing position. The hubs and the drive holes in said blank register with one another when the folding plates are in the vertical facing position. The fold formed is heated to a predetermined temperature to anneal the material, thereby reducing internal stresses therein.

The invention also includes side flap folding apparatus and sealing apparatus which are attached to the back surfaces of the folding plates providing side flap folding and side flap sealing, respectively. The side flap folding apparatus and sealing apparatus swing into and out of operating position with the folding plates to which they are attached. The operating position is attained when the folding plates are positioned so that the continuous surfaces are in vertical planes facing each other. Thus, all three operations of forming the centerfold, forming the side flap folds, and heating the folds to the annealing temperature are all performed in the same station using the same mandrel and hence eliminating any misregistration problems encountered in multi-station operation.

BRIEF DESCRIPTION OF THE DRAWINGS

FIG. 4 is a schematic diagram showing the folding blade mechanism in its up and down positions.

FIG. 5 is a plan view of FIG. 4 showing the folding blade in more detail.

FIG. 6 is a schematic diagram taken along the line 6—6 of FIG. 5 showing the air-spring loading of the folding blade.

DESCRIPTION OF THE PREFERRED EMBODIMENT

Figure 1:
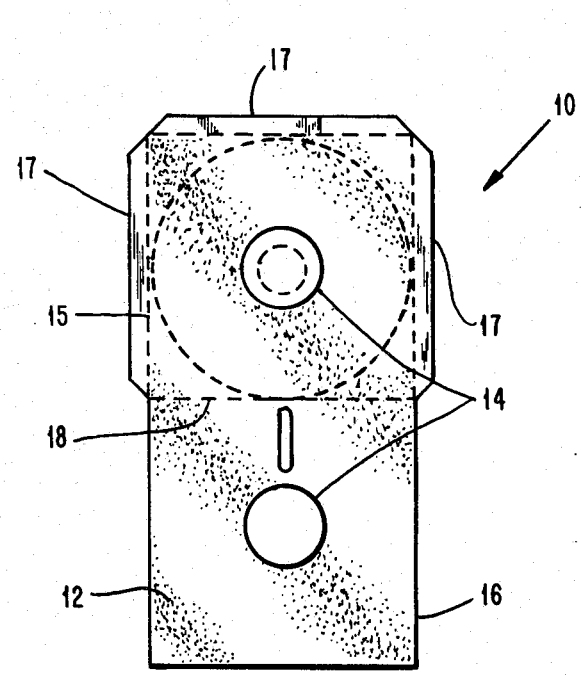
FIG. 1 is a schematic diagram showing a prepunched flexible material blank from which the envelope is formed.

The plastic blank 10, shown in FIG. 1, is precut from a flexible plastic material and has a liner material 12 applied to one side which performs an anti-static and cleaning function on the magnetic disk in the finished envelope. The blank is prepunched to have a drive hole 14 in each of two equal sections 15 and 16 except that the section 15 has flaps 17 extending from the end and two sides thereof. The drive holes 14 are located in the same relative position in the sections 15 and 16 and are aligned during bending of the sections so that the centerfold 18 can be located and formed in the middle of the two sections 15 and 16.

Figure 2:
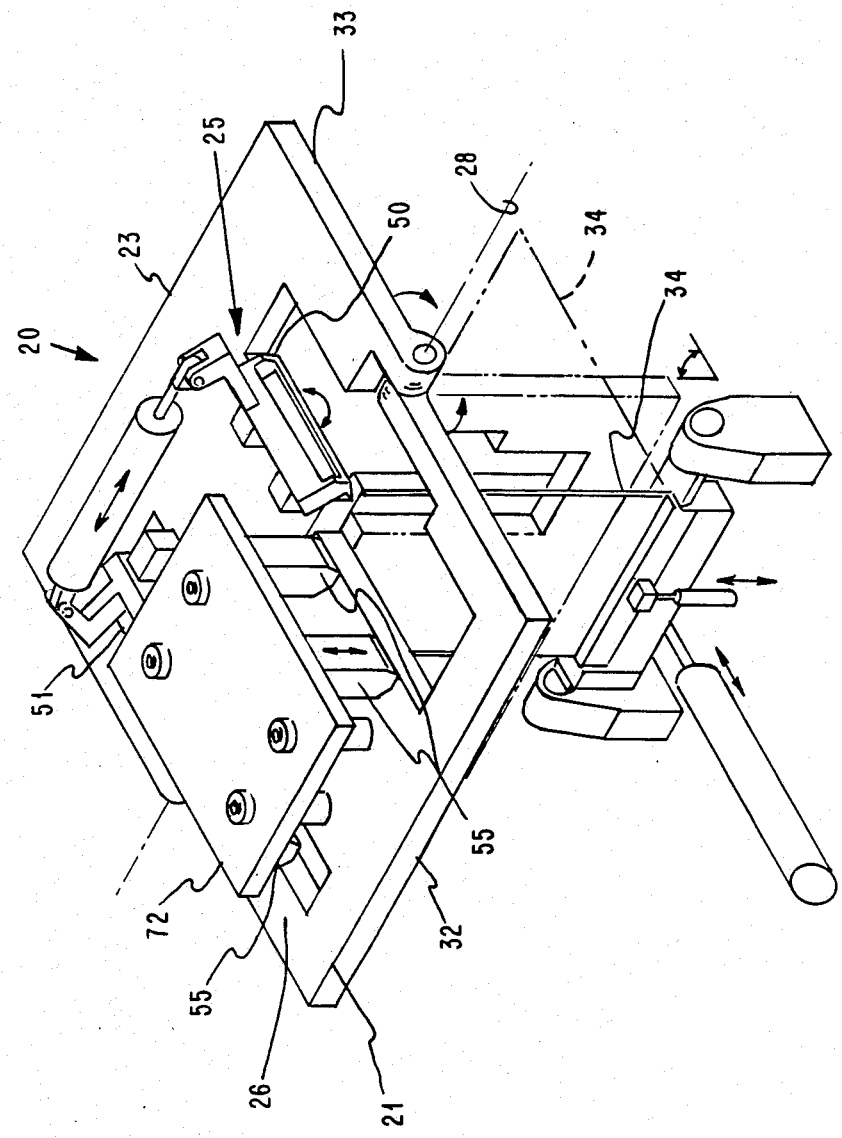
FIG. 2 is a perspective diagram showing the centerfold apparatus and the attached side flap folding and bonding apparatus.
Figure 7A:
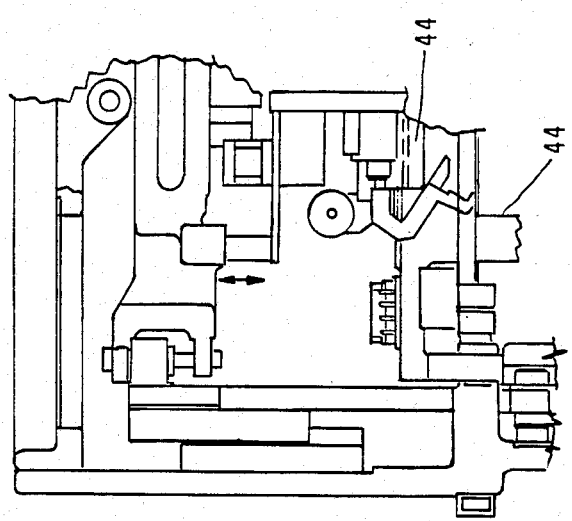
FIGS. 7 and 7A are schematic side and front view diagrams, respectively, of the folding and bonding apparatus, showing one folding plate in the up position and the other in the down position.
Figure 7:
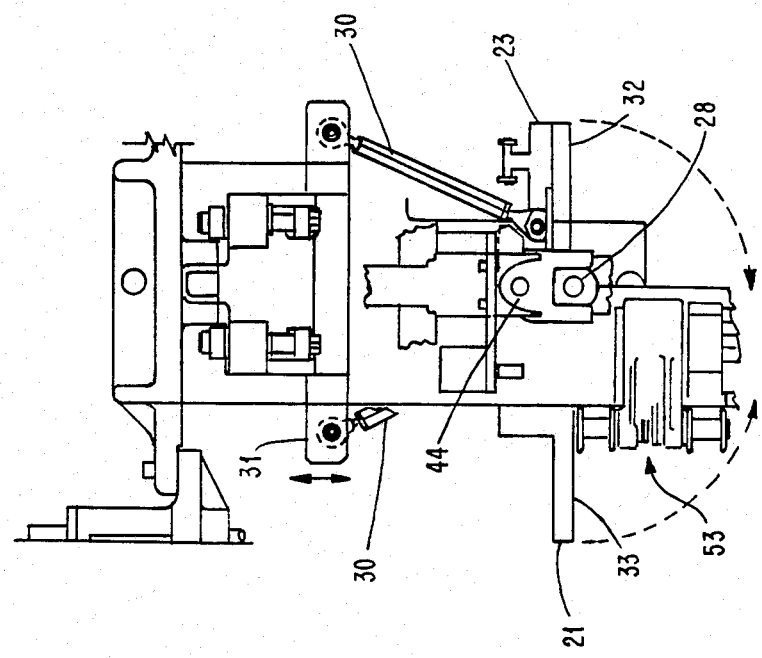

The centerfold apparatus 20 of the machine consists of two flat folding plates 21 and 23, as shown in FIG. 2. Each of these plates has a different mechanism attached to the rear surface thereof. The plate 23 has a side flap folding mechanism 25 attached to the back side thereof and the plate 21 has the thermal spot bonding mechanism 26 attached to the back side thereof. The folding plates 21 and 23 pivot downward about one pivot axis 28, and are actuated by a linkage 30 which is driven by a cam and bar arrangement 31, as shown in FIG. 7. The plates 21 and 23, when actuated, move either up or down in an arcuate path about the pivot point 28. When actuated upward, to the full up position, the lowermost machined surfaces 32 and 33 of the plates form a flat horizontal plane. When actuated downward, these machined surfaces rotate 90° to the vertical plane and are machined such that when, in the vertical position, a gap of 0.050 inch exists between these surfaces 32 and 33.

This space is provided for a 0.030 thick steel folding mandrel 34, shown in FIGS. 2, 3, 4 and 5, over which the product is formed, and two product thicknesses, i.e. one thickness on either side of the mandrel.

When the plates 21 and 23 are actuated to the upward position and the machined plate surfaces 32 and 33 are in the horizontal plane, the transfer shuttle carriage, not shown, moves forward transferring a flat flexible plastic blank 10 to the underside of the folding plates 21 and 23. The flat plastic blank 10 is held against the horizontal plate surfaces 32 and 33 by vacuum and is accurately located by hubs 35 and 35', shown in FIG. 3., which protrude below the machined plate surfaces. These locating hubs 35 and 35' are so configured as to intermesh when the folding plates are actuated to the vertical position.

Figure 3:
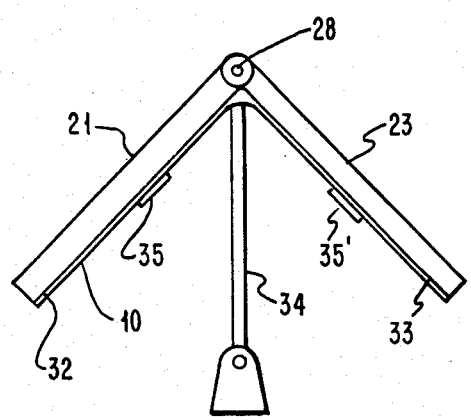
FIG. 3 is a schematic diagram showing a side view of the centerfold apparatus with a flexible material blank in place and illustrating the centerfold forming.

After a flat flexible plastic blank 10 has been transferred to or placed against the folding plates 21 and 23 and is held in position by the plate vacuum, a steel folding mandrel 34 is actuated upward to apply pressure against the lower face of the product 10 in the area of the fold centerline 18. When the folding plates 21 and 23 are actuated downward, accurate fold location is maintained by the mandrel 34, as shown in FIG. 3. The mandrel 34 is spring loaded by an air cylinder 39, shown in FIG. 6, which maintains a given force of the mandrel against the flexible plastic blank 10 causing the drive holes 14 which are located in the plastic blank 10, and which are mounted on the hubs extending from the bottom surface of the respective folding plates, to pull taut so that the bottoms of the drive holes 14 are against the bottoms of the respective hubs. This technique causes the centerfold to be in the exact center of the two sections, thus compensating for any hole location or size out-of-tolerance condition.

The mandrel or folding blade 34 is shown in FIG. 4 in both the vertical and horizontal position. It is necessary to move the mandrel 34 to the horizontal position, out of the way, so that the plastic blank 10 can be loaded on the underside of folding plates 21 and 23. As mentioned above, the mandrel 34 is moved to the vertical position to locate and aid the fold across the center of the plastic blank 10. The mandrel 34 is swiveled about an end thereof by a cylinder 36 which drives a linkage 38 carrying the mandrel about a pivot 40. The plan view of the mandrel 34 and its operating apparatus is shown in FIG. 5. It should be noted that the mandrel 34 contains an opening 42 therein of sufficient size that the locating hubs 35 and 35' in the folding plates 21 and 23 will intermesh through the opening 42 in the mandrel when the folding plates are closed, that is, one positioned on either side of the mandrel 34.

Once the centerfold is formed by the closed folding plates 21 and 23 holding the sections 15 and 16 of the flexible plastic blank 10 against opposite sides of the mandrel 34, heat is applied for a short time to the fold to cause annealing or heat setting. The heat is supplied by an infrared heat lamp 44 which extends along the edge of the blank adjacent the centerfold. After completion of the heat cycle, a small jet of compressed air is directed over the heated surface to aid in lowering the fold temperature to ambient. This condition locks both folding plates 21 and 23, mandrel 34 and the product 10 together, maintaining accurate registration of all members during the side fold, heat set and spot bonding operations.

Figure 8:
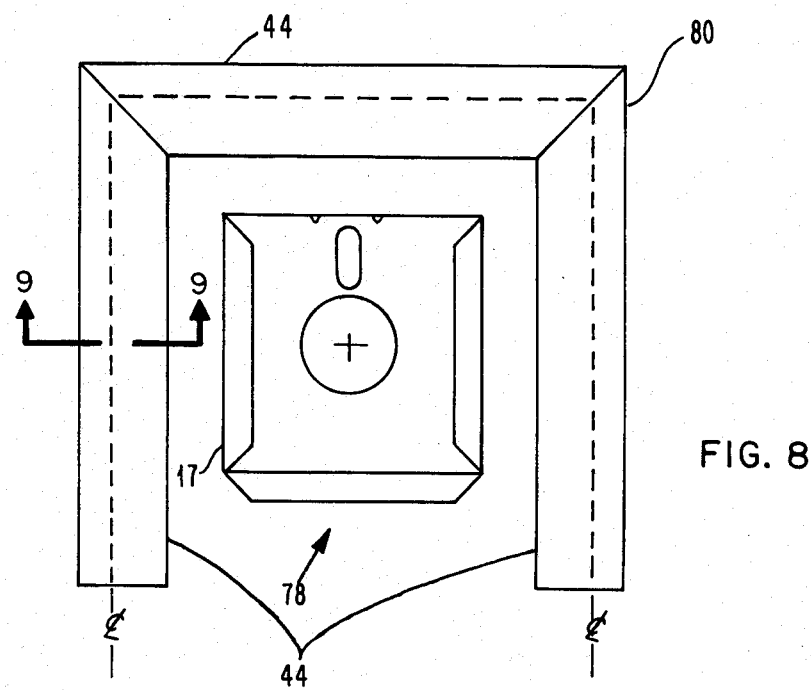
FIG. 8 is an illustrative diagram showing the heating means on the three sides of the open envelope.
Figure 9:
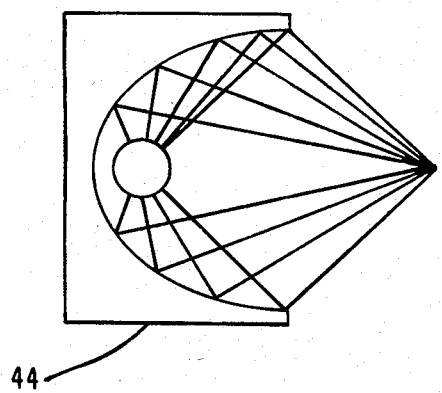
FIG. 9 is a schematic diagram along the line 9—9 showing the reflector shape and bulb therein.

When the centerfold is completed and folding plates 21 and 23 are in a vertical position, the flexible blank 10 is folded in half and locked in place by the folding plates which apply pressure against the flexible blank 10 sections, holding them against the steel mandrel 34. It should be appreciated that the side flaps 17 extend beyond the folding mandrel 34 and that the folding plate 21, which carries the bonding apparatus 26, is sufficiently narrow or has cutout sections therein so that the underlying portion of the flexible blank 10 along the side edges is exposed so that the flaps can be secured thereto. The side flap folding operation can now be initiated. The side flap folding mechanism 25 is attached to the back of the folding plate 23. The flexible blank 10 is positioned on the folding plates such that the section of the blank with the side flap folds extending therefrom is first. The side flap folding mechanism 25 contains two folding blades 50 and 51, one for folding the flap about one side of the product and mandrel 34 and the other blade for folding a side flap 17 around the other side of the mandrel 34. The folding blades 50 and 51 in the retracted position lay behind the protruding side flaps 17 and are positioned away from the folding plate 23 center line to clear the side edges of the steel mandrel 34. Heat energy is supplied by three infrared heat lamps 44 (see FIGS. 8 and 9), one extending along each of the edges of the mandrel 34 about which a fold has been formed. Thus, there is a heat lamp 44 extending along the side edges and bottom edge of the formed product 78. The controller, not shown, which controls these lamps is so designed that each lamp is independently controlled. The power to each lamp may be increased or decreased as required, as may the time the individual lamps are turned on. This allows the operator to compensate for product or process variations. The infrared lamps 44 include eliptical reflectors so that nearly all of the radiant energy generated by the infrared lamps would be focused at the adjacent folded edge of the product, as shown in FIG. 9. This focused energy causes a very quick temperature rise in the folded product edges.

After the completion of the heat set cycle, a small jet of compressed air is directed over the heated surfaces to aid in lowering the fold temperature to ambient.

Following the side flap folding and thermal setting operations, the folding blades or bars 50 and 51 retract, leaving the folded side flaps 17 in place, ready to be spot bonded. The spot bonding is accomplished by the bonding platen assembly 26 which consists of several subassemblies, one of which is a "U" shaped assembly 53, which supports four protrusions 55, two on either side of the product. Each of these four protrusions 55 has two bonding studs (not shown) which extend downward from the bottom end. These four protrusions 55 also house resistance heating units which maintain the thermal bonding temperature of these extended studs. The spot bonding of the folded side flaps 17 permanently attaches the inside face of the folded side flaps 17 to the outside of the opposite flat face of the envelope, forming a permanent closure of the envelope sides. This thermal spot bonding assembly is located on the back of the pivoted folding plate 21.

Figure 10:
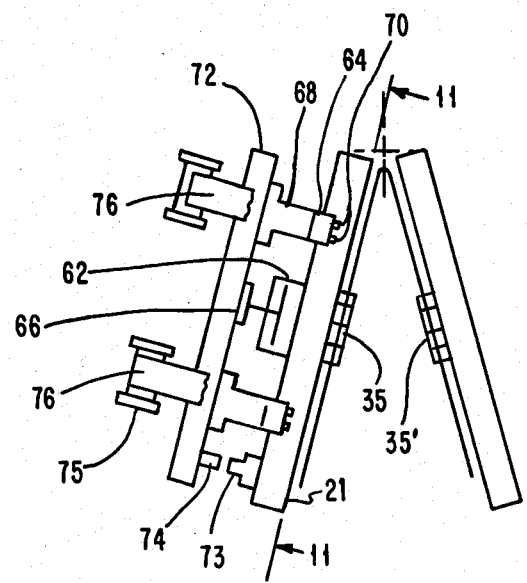
FIG. 10 is a schematic side view of the centerfold apparatus with the bonding apparatus attached to the back of the folding plate.
Figure 11:
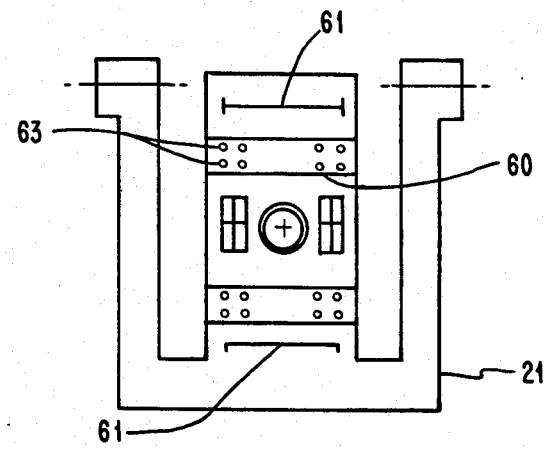
FIG. 11 is a schematic view taken along the line 11—11 of FIG. 10, showing the front surface of the folding plate.

The folding plate 21, FIGS. 10 and 11, has on its face the alignment hub 35, the relief 60 for the tape and vacuum grooves 61 which are used to hold the flexible blank 10 firmly on the alignment hub 35 during the centerfold, side fold, thermal set, and bonding operations. The vacuum holes 63 in the tape slot 60 hold the tape in place and also serve as a sensor when the tape roll has expired. During the folding and thermal set operations, the folding plate 21 is in the vertical position. After the side folds are formed and thermally set, the pancake cylinder 62 is actuated moving the heaters and bonding studs 70 into contact with the side fold to provide bonding thereof. The shaft spacer 66 is ground to a predetermined dimensions which controls the depth of penetration of the side fold stake.

The heater, which is a built-in thermalcouple, is embedded in a chrome-copper staking head 64 which has two protrusions or bonding studs 70 machined on the lower end which contact the side fold and transfers heat to perform the staking operation. Heat transfer is controlled by means of an insulator block 68 which isolates the staking head 64 from the top plate 72 and the rest of the assembly. The position of the top plate 72 with respect to the side fold, that is engaged or disengaged with the side fold, is determined by a sensor 73 and magnet 74 mounted on the folding plate 21, and top plate 72, respectively. The tape payout spool assembly 75 and the tape drive assembly (not shown) are mounted to the top plate 72. The tape 76 is threaded from the payout spool assembly 75 through the tape guide over the protrustions 70 on the staking head 64 through the recessed slot 60 in the face of the folding plate 21 over the other staking head 64 onto the tape drive assembly. The tape 76 is indexed periodically under control of the program. The nylon tape 76 is used to separate the staking head protrusions 70 from the material of the side fold. This prevents sticking and splashing of the diskette material in the staked area.

The bonding operation is not limited to the staking approach but can be a sealing process such as glueing.

It should be noted that the centerfold operation, the side flap fold operation and the bonding operation are all performed in the same station using the same mandrel for forming the folds and for a backup plate for the bonding. The use of the same mandrel in the same station avoids the various tolerance errors inherent in changing mandrels or stations.

Following the centerfold, side flap fold and bonding operation, the mandrel 34 is stripped from the blank and a disk is inserted. The third flap fold and bond takes place to complete the diskette.

While the invention has been described with reference to a particular embodiment, it will be understood by those skilled in the art that various modifications in form and detail may be made without departing from the spirit and scope of the invention.

What is claimed is:

1. Apparatus for preforming an envelope for a plastic disk from a prepunched, flexible, plastic blank having two sections connected at the heads thereof and containing a drive hole at the same location in each section, one section having folding flaps extending from three edges thereof comprising:
   a first and second folding plate positioned head to head each having a first and second surface thereon so that the first surfaces thereof are contiguous and lie in the same horizontal plane,
   means for holding said flexible plastic material blank against said first surfaces of said first and second folding plates,
   drive means for providing pivoting motion between said first and second folding plates to move said folding plates in an arcuate path so that the first surfaces are positioned in vertical planes facing each other, a hub located at the same location in each first surface of each first and second folding plate so that said hubs register with one another when said plates are positioned in the vertical planes, said drive hole in each section of the flexible blank fitting over said respective hub to locate the blank on said first surfaces, a mandrel extendable vertically and having an edge thereof in the extended position pressing against said blank in the area between said first and second plates pulling said drive holes in the blank taut on said hubs thereby locating the center line of said blank, said drive means moving said folding plates from the horizontal to the vertical facing position causing said blanks to bend along the pressing edge of said mandrel forming the centerfold, side flap fold forming apparatus attached to the second surface of the one of said first and second folding plates having said section of said blank having folding flaps extending from the three edges thereof held on said first surface thereof, a side flap fold sealing apparatus attached to the back surface of the other of said first and second folding plates, said side flap folding and sealing apparatus being in operating position when said folding plates are positioned so that said first surfaces are positioned in vertical planes facing each other to form said centerfold, cutout sections located along the side edges of said first and second folding plates and providing room for said side flap folding apparatus to fold said side flaps about said mandrel and for said sealing apparatus to perform said sealing operation on said folded flaps, respectively, means for heating said centerfold and said side flap folds to a predetermined temperature to anneal the material, thereby reducing internal stresses therein.

2. Apparatus according to claim 1 wherein said mandrel is pivotably mounted so as to pivot from a horizontal to a vertical position so that the top edge presses against the adjacent surface of said blank.

3. Apparatus according to claim 1 wherein said mandrel is spring loaded by an air cylinder which extends and retracts the mandrel and holds the force of the mandrel edge against said blank to maintain said drive holes taut on said hubs to locate the center line and maintain the force throughout the folding operation of said first and second folding plates.

4. Apparatus for forming an envelope according to claim 1 wherein said side flap folding apparatus provides the folding of the side flaps extending from opposite side edges of said blank about said mandrel used for forming the centerfold and said sealing apparatus provides the sealing of the side flaps to said blank using said mandrel as a base therefor.

* * * * *